United States Patent [19]

Mohan

[11] Patent Number: 5,092,302
[45] Date of Patent: Mar. 3, 1992

[54] FUEL PUMP SPEED CONTROL BY DC-DC CONVERTER

[75] Inventor: Robert J. Mohan, Canton, Mich.

[73] Assignee: Ford Motor Company, Dearborn, Mich.

[21] Appl. No.: 633,913

[22] Filed: Dec. 26, 1990

[51] Int. Cl.[5] ............................................. F02M 37/04
[52] U.S. Cl. ..................................... 123/497; 323/351
[58] Field of Search ....................... 123/497, 498, 499; 417/22, 45, 210; 323/351; 363/24, 25, 26

[56] References Cited

U.S. PATENT DOCUMENTS

| | | | |
|---|---|---|---|
| 3,675,115 | 7/1972 | O'Loughlin | 323/351 |
| 4,359,984 | 11/1982 | Nakao | 123/497 |
| 4,508,077 | 4/1985 | Shimbara | 123/357 |
| 4,513,360 | 4/1985 | Ikenoue et al. | 323/351 |
| 4,565,173 | 1/1986 | Oshiage et al. | 123/357 |
| 4,576,135 | 3/1986 | Johnson . | |
| 4,577,604 | 3/1986 | Hara et al. | 123/358 |
| 4,617,620 | 10/1986 | Speranza . | |
| 4,732,129 | 3/1988 | Takigawa et al. . | |
| 4,756,291 | 7/1988 | Cummins et al. | 123/497 |
| 4,791,905 | 12/1988 | Furuta et al. . | |
| 4,800,859 | 1/1989 | Sagisaka et al. . | |
| 4,811,185 | 3/1989 | Cook et al. | 363/24 |
| 4,919,102 | 4/1990 | Iwabuchi | 123/499 |
| 4,932,387 | 6/1990 | Flam et al. | 123/497 |
| 4,980,813 | 12/1990 | Wells | 363/24 |
| 4,999,568 | 3/1991 | Gulczynski | 323/351 |

FOREIGN PATENT DOCUMENTS

| | | | |
|---|---|---|---|
| 0028832 | 2/1982 | Japan | 123/497 |
| 0015755 | 1/1983 | Japan | 123/497 |

*Primary Examiner*—E. Rollins Cross
*Assistant Examiner*—Thomas N. Moulis
*Attorney, Agent, or Firm*—Peter Abolins; Roger L. May

[57] ABSTRACT

A control apparatus for an electric fuel pump of a motor vehicle having an internal combustion engine which receives operating fuel from the motor operated fuel pump includes a dc-dc converter connected between a power source and the fuel pump. The dc-dc converter provides power for driving the fuel pump and is responsive to a voltage demand signal for setting the voltage level of the power. In one embodiment of the invention, a voltage demand signal generator, which generates the voltage demand signal, is a zener diode for generating a fixed voltage level for the power independent of the voltage level of the storage battery. In a second embodiment, the voltage demand signal generator is a portion of an engine control circuit for generating a varying voltage level for the power which is dependent on the operating conditions of the internal combustion engine.

15 Claims, 1 Drawing Sheet

FUEL PUMP SPEED CONTROL BY DC-DC CONVERTER

BACKGROUND OF THE INVENTION

The present invention relates generally to a fuel pump speed controller and, more particularly, to control of a fuel pump using a dc-dc converter controlled by an integrated circuit chip.

It is well known in the art to use dc-dc converters as power supplies. Existing uses for dc-dc converters also include using such converters for driving fuel injection systems at substantial voltage levels. For example, Johnson, U.S. Pat. No. 4,576,135 discloses an electromechanical fuel injector system for use with an internal combustion engine which includes one or more electrically operated fuel injectors. The fuel injection circuitry is designed to operate from the engine storage battery; however, the injectors themselves are driven by a 60 volt dc signal, a voltage level substantially higher than the voltage of the battery to which the circuitry is connected.

Also, Speranza, U.S. Pat. No. 4,617,620, discloses an acoustic fuel injector which includes a dc-dc converter for supplying a regulated 200 volt output voltage to a frequency-controlled oscillator which drives acoustic injector valves. The oscillator circuit connects an AC pulse of closely controlled frequency and amplitude to the acoustic injector valves. The timing of the AC pulses is a function of engine speed and fuel demand and is controlled by external means not disclosed in the reference.

One existing controller for regulating the voltage applied to fuel pumps is disclosed in Furuta et al, U.S. Pat. No. 4,791,905, which controls the quantity of fuel delivered to an engine. The controller includes an electric dc fuel pump motor which is controlled by varying the electrical resistance connected in circuit between a storage battery and the motor. A fixed resistor may be selectively switched by a relay to connect the motor to the battery through the resistor or through relay contacts which short the resistor to provide no substantial electric resistance. Thus, the battery is supplied directly to the fuel pump motor during engine starting but then is switched to be supplied through a fixed resistor at a reduced voltage level thereafter for engine idle or other reduced fuel operation. In a second embodiment of the invention, the relay switch is eliminated and the fixed resistor is replaced by a variable resistor whose resistance value is continuously controlled. However, in both instances, the voltage level of power provided to the fuel pump can never be increased to a level above the battery voltage and there is a loss of efficiency in using a dropping resistor over using a dc-dc converter.

It is seen then that there is a need for a voltage regulating fuel pump speed controller which can maintain an optimal voltage level at any operating speed and battery voltage.

SUMMARY OF THE INVENTION

This need is met by the fuel pump control method and apparatus of the present invention in which an existing fuel pump is driven by dc-dc converter means preferably controlled via an integrated circuit chip to operate as a fuel pump motor driver. The dc-dc converter has two inputs. The first input is an unfiltered storage battery voltage or other input voltage which is used to power the converter and to power the fuel pump via the converter. The second input to the dc-dc converter is a voltage demand signal from a voltage demand signal generator means which identifies the voltage required for proper operation of the fuel pump. The voltage demand signal may vary with engine parameters or may be set to a specific voltage. In any event, the voltage supplied to the fuel pump is substantially equal to the demanded voltage regardless of the unfiltered input voltage from the battery, within realistic limits, since the dc-dc converter can increase the output voltage due for example to low battery charge, or decrease the output or fuel pump voltage when less power is required for example at engine idle.

In addition, the dc-dc converter controller of the present invention is capable of protecting the fuel pump from high voltage transients and permits less stringent fuel pump motor requirements. By controlling the voltage demand in response to engine parameters, for example by signals from an engine control module, lower power dissipation results during periods of low fuel demand and pump voltage can be boosted for low input voltage operation.

In accordance with one aspect of the present invention, control apparatus for an electric fuel pump of a motor vehicle having a storage battery defining a variable voltage level and further having an internal combustion engine which receives operating fuel from the fuel pump comprises voltage control means connected between the storage battery and the fuel pump for driving the fuel pump at a desired voltage level substantially independent of the voltage level of the storage battery. In a preferred embodiment thereof, the voltage control means comprises a dc-dc converter.

In a further embodiment, the control apparatus also comprises voltage demand signal generator means for generating a voltage demand signal. The voltage control means comprises a dc-dc converter responsive to the voltage demand signal for generating drive voltage for the fuel pump. The voltage demand signal generator means may comprise a zener diode for generating a fixed voltage demand signal regardless of the voltage level of the storage battery. Alternatively, the voltage demand signal generator means may comprise a portion of an engine control circuit for generating a varying voltage demand signal dependent upon the operating conditions of the internal combustion engine.

In accordance with one embodiment of the present invention, the dc-dc converter means comprises an input conditioning and gain operational amplifier responsive to the voltage demand signal for generating an internal voltage control signal. A pulse width modulator circuit is connected to the operational amplifier and is responsive to the internal voltage control signal for generating a pulse width modulation control signal. A transistor driver circuit is responsive to the pulse width modulation control signal for generating an output drive signal which drives a transformer and power circuit. The transformer and power circuit generates an output signal for driving the fuel pump in accordance with the voltage demand signal. In a preferred embodiment thereof, the pulse width modulator circuit comprises an integrated circuit.

In accordance with another aspect of the present invention, a control apparatus for an electric fuel pump of a motor vehicle having a storage battery and an internal combustion engine which receives operating fuel from the fuel pump comprises motor means for operating the fuel pump and dc-dc converter means connected between the storage battery and the motor means for driving the motor means. The dc-dc converter means is responsive to a voltage demand signal for setting the voltage level of the pump. A voltage demand signal generator means generates the voltage demand signal. In one embodiment, the voltage demand signal generator means comprises a zener diode for generating a fixed voltage level for the power regardless of the voltage level of the storage battery. In another embodiment, the voltage demand signal generator means comprises a portion of an engine control circuit for generating a varying voltage demand signal dependent upon the operating conditions of the internal combustion engine.

The dc-dc converter means preferably comprises an input conditioning and gain operational amplifier responsive to the voltage demand signal for generating an internal voltage control signal. A pulse width modulator circuit is connected to the operational amplifier and is responsive to the internal voltage control signal for generating a pulse width modulation control signal. A transistor driver circuit is responsive to the pulse width modulation control signal for generating an output drive signal which drives a transformer and power circuit. The transformer and power circuit generates an output signal for driving the fuel pump in accordance with the voltage demand signal. In a preferred embodiment of the present invention, the pulse width modulator circuit comprises an integrated circuit.

The present invention also provides a method for controlling an electric fuel pump of a motor vehicle having a storage battery and an internal combustion engine which receives operating fuel from the fuel pump. The method comprises the steps of: connecting a dc-dc converter between the storage battery and the fuel pump; generating a voltage demand signal; and, operating the dc-dc converter in response to the voltage demand signal to control the drive voltage applied to the fuel pump. In one embodiment, the step of generating a voltage demand signal comprises generating a constant voltage demand signal. In another embodiment, the step of generating a voltage demand signal comprises generating a varying voltage demand signal corresponding to operating conditions of the internal combustion engine.

Other features and advantages of the invention will be apparent from the following description, the accompanying drawing, and the appended claims.

DETAILED DESCRIPTION OF THE PREFERRED EMBODIMENT

Figure 1:
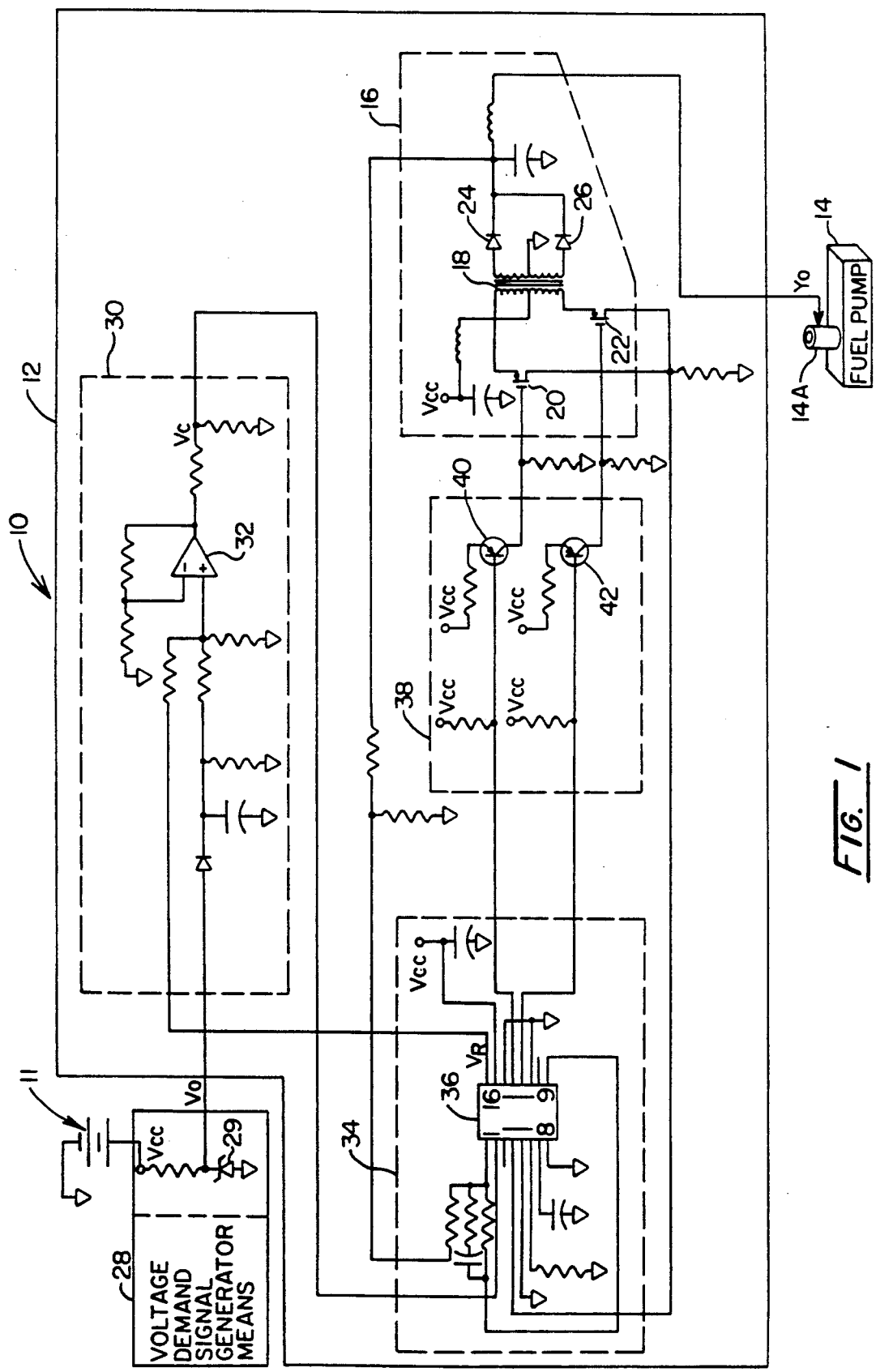
FIG. 1 is a circuit block diagram showing an existing fuel pump controlled by control apparatus in accordance with the present invention.

The present invention relates to control of a fuel pump using a dc-dc converter preferably controlled by an integrated circuit chip. The dc-dc converter is operated as a motor driver to control a conventional vehicle fuel pump motor. The dc-dc converter receives unfiltered battery voltage which is used both to power the converter and to power the fuel pump via the converter. A second input to the dc-dc converter is a voltage demand signal which identifies a desired voltage required for proper operation of the fuel pump. The dc-dc converter of the present invention is capable of protecting the fuel pump from high voltage transients. Additionally, the voltage regulation allows for less stringent fuel pump motor requirements and voltage boosting allows for low input voltage operation. By controlling the voltage demand in response to engine parameters, for example by signals from an engine control module, lower power dissipation results during periods of low fuel demand.

Referring now to FIG. 1, a control apparatus 10 for an electric fuel pump of a motor vehicle having a power means such as a storage battery 11 defining a variable voltage level and further having an internal combustion engine (not shown) which receives operating fuel from the fuel pump is illustrated. The control apparatus 10, illustrated in circuit block diagram form, includes voltage control means 12. A conventional vehicle fuel pump 14 is controlled by the voltage control means which preferably comprises dc-dc converter means taking the form of a dc-dc converter 12 connected between the storage battery of the motor vehicle and the fuel pump 14 of the motor vehicle. The dc-dc converter 12 drives the fuel pump 14 at a desired voltage level substantially independent of the voltage level of the vehicle storage battery. The fuel pump 14 includes a motor 14A, which may be integrated into the fuel pump 14 or may be separate from the fuel pump 14, depending on the design of the fuel pump 14.

Although the dc-dc converter 12 may take many forms, including combinations of two transformers, in a preferred embodiment of the present invention, the dc-dc converter 12 includes transformer and power circuitry, indicated as block 16 in FIG. 1. The transformer and power circuitry 16 includes a push-pull type power stage consisting of a transformer 18, two MOSFET transistors 20 and 22, and two output diodes 24 and 26. The vehicle storage battery 11 provides a voltage level $V_{cc}$, which varies between 6 and 16 volts and is typically 6 volts during engine start up. The variable voltage level $V_{cc}$ from the battery is used to power both the dc-dc converter 12 and the fuel pump 14 through the dc-dc converter 12.

In a preferred embodiment of the present invention, the control means 10 includes a voltage demand signal generator means 28 for generating a voltage demand signal $V_D$. The voltage demand signal $V_D$ is representative of the desired voltage level required for proper operation of the fuel pump 14. In this embodiment, the dc-dc converter 12 is responsive to the voltage demand signal for generating drive voltage for the fuel pump 14. The voltage demand signal $V_D$ may vary with engine parameters as generated, for example, by an engine control module represented by the generator means 28 or may be set to a specific voltage, for example by a zener diode 29. A typical variance would be 8 to 12 volts.

When the voltage demand signal generator means 28 comprises the zener diode 29, a fixed voltage demand signal is generated to in turn provide a fixed drive voltage for the fuel pump 14 regardless of the voltage level of the input voltage or storage battery 11. Alternatively, when the voltage demand signal generator means 28 comprises a portion of an engine control circuit for generating a varying voltage level for the power dependent upon the operating conditions of the internal combustion engine of the vehicle, the drive voltage varies to optimize fuel to the engine. In any event, the voltage supplied to the fuel pump 14, therefore, is equal to the demanded voltage regardless of the battery voltage $V_{CC}$. The dc-dc converter 12 also serves a filtering function to prevent high voltage transients from reaching the fuel pump 14.

Continuing with FIG. 1, the dc-dc converter 12, which controls the operating speed of the fuel pump 14 through a motor 14A, is illustrated. In FIG. 1, a preferred embodiment of the dc-dc converter 12 includes an input conditioning and gain operational amplifier circuit 30 responsive to the voltage demand signal $V_D$ for generating an internal voltage control signal, the input conditioning and gain operational amplifier circuit 30 including an operational amplifier 32. The operational amplifier 32 may be any suitable summing amplifier such as a National Semiconductor LM358 operational amplifier. The input conditioning and gain amplifier circuit 30 preferably comprises the summing amplifier 32 which receives the voltage demand signal $V_D$ from the voltage demand signal generator means 28 and a minimum voltage reference signal $V_R$.

The dc-dc converter 12 further comprises a pulse width modulator circuit 34 connected to the operational amplifier 32 and responsive to the internal voltage control signal for generating a pulse width modulated control signal. The pulse width modulator circuit 34 includes a pulse width modulator integrated circuit chip 36 which outputs the voltage reference signal $V_R$ to the input conditioning and gain operational amplifier circuit 30. The dc-dc converter 12 further includes a transistor driver circuit 38 connected to the pulse width modulator circuit 34 and responsive to the pulse width modulation control signal for generating an output drive signal. Finally, the dc-dc converter means 12 preferably includes the transformer and power circuit 16 connected to the transistor driver circuit 38 and responsive to the output drive signal for generating an output signal for driving the fuel pump 14 in accordance with the voltage demand signal $V_D$.

The present invention also provides for a method for controlling an electric fuel pump of a motor vehicle having a storage battery and an internal combustion engine which receives operating fuel from the fuel pump 14. The method includes the step of connecting the dc-dc converter 12 between the storage battery 11 and the fuel pump 14, generating the voltage demand signal $V_D$, and operating the dc-dc converter means 12 in response to the voltage demand signal $V_D$ to control the drive voltage applied to the fuel pump 14. The step of generating a voltage demand signal $V_D$ may comprise generating a constant voltage demand signal $V_D$. Alternatively, the step of generating a voltage demand signal $V_D$ may comprise generating a varying voltage demand signal corresponding to operating conditions of the internal combustion engine.

During operation of the dc-dc converter 12, the operational amplifier 32 sums the voltage demand signal $V_D$ and voltage reference signal $V_R$ to generate an internal voltage control signal $V_C$ which is passed to the regulating pulse width modulator (PWM) chip 36 of a pulse width modulator circuit 34. The regulating PWM chip 36, may be any suitable voltage regulator such as a National Semiconductor LM3524N chip. The regulating PWM chip 36 generates a pulse width modulated drive signal to the transistor driver circuit 38, which includes transistors 40 and 42. The transistor driver circuit 38, in turn, drives the transformer and power circuit 16. The transformer and power circuit 16 powers the fuel pump 14 and generates an output voltage feedback signal to the regulating PWM chip 36.

Having described the invention in detail and by way of reference to preferred embodiments thereof, it will be apparent that other modifications and variations are possible without departing from the scope of the invention defined in the appended claims.

What is claimed is:

1. Control apparatus for an electric fuel pump of a motor vehicle having an external power source defining a variable voltage level and further having an internal combustion engine which receives operating fuel from said fuel pump, said control apparatus comprising voltage control means connected between said external power source and said fuel pump for driving said fuel pump at a desired voltage level selectable from levels greater than, less than or substantially equal to the voltage level of said external power source dependent upon engine operating conditions.

2. Control apparatus for an electric fuel pump of a motor vehicle as claimed in claim 1 wherein said voltage control means comprises a dc-dc converter.

3. Control apparatus for an electric fuel pump of a motor vehicle as claimed in claim 2 wherein said voltage demand signal generator means comprises a zener diode for generating a fixed voltage demand signal regardless of the voltage level of said external power source.

4. Control apparatus for an electric fuel pump of a motor vehicle as claimed in claim 3 wherein said voltage demand signal generator means comprises a portion of an engine control circuit for generating a varying voltage demand signal dependent upon the operating conditions of said internal combustion engine.

5. Control apparatus for an electric fuel pump of a motor vehicle as claimed in claim 1 further comprising voltage demand signal generator means for generating a voltage demand signal, said voltage control means comprising a dc-dc converter responsive to said voltage demand signal for generating drive voltage for said fuel pump.

6. Control apparatus for an electric fuel pump of a motor. vehicle as claimed in claim 1 wherein said dc-dc converter means comprises:
   an input conditioning and gain operational amplifier responsive to said voltage demand signal for generating an internal voltage control signal;
   a pulse width modulator circuit connected to said operational amplifier and responsive to said internal voltage control signal for generating a pulse width modulation control signal;
   a transistor driver circuit connected to said pulse width modulator circuit and responsive to said pulse width modulation control signal for generating an output drive signal; and
   a transformer and power circuit connected to said transistor driver circuit and responsive to said output drive signal for generating an output signal for driving said fuel pump in accordance with said voltage demand signal.

7. Control apparatus for an electric fuel pump of a motor vehicle as claimed in claim 6 wherein said pulse width modulator circuit comprises an integrated circuit.

8. Control apparatus for an electric fuel pump of a motor vehicle having an external power source and an internal combustion engine which receives operating fuel from said fuel pump, said control apparatus comprising:

motor means for operating said fuel pump;

dc-dc converter means connected between said external power source and said motor means for providing power for driving said motor means, said dc-dc converter means being responsive to a voltage demand signal for setting the voltage level of said power at a desired voltage level greater than, less than or substantially equal to the voltage level of said external power source; and voltage demand signal generator means for generating said voltage demand signal dependent upon operating conditions of said internal combustion engine.

9. Control apparatus for an electric fuel pump of a motor vehicle as claimed in claim 8 wherein said dc-dc converter means comprises:

an input conditioning and gain operational amplifier responsive to said voltage demand signal for generating an internal voltage control signal;

a pulse width modulator circuit connected to said operational amplifier and responsive to said internal voltage control signal for generating a pulse width modulation control signal;

a transistor driver circuit connected to said pulse width modulator circuit and responsive to said pulse width modulation control signal for generating an output drive signal; and a transformer and power circuit connected to said transistor drive circuit and responsible to said output drive signal for generating an output signal for driving said fuel pump in accordance with said voltage demand signal.

10. Control apparatus for an electric fuel pump of a motor vehicle as claimed in claim 9 wherein said pulse width modulator circuit comprises an integrated circuit.

11. Control apparatus for an electric fuel pump of a motor vehicle as claimed in claim 8 wherein said voltage demand signal generator means comprises a zener diode for generating a fixed voltage level for said power regardless of the voltage level of said external power source.

12. Control apparatus for an electric fuel pump of a motor vehicle as claimed in claim 8 wherein said voltage demand signal generator means comprises a portion of an engine control circuit for generating a varying voltage demand signal dependent upon the operating conditions of said internal combustion engine.

13. A method for controlling an electric fuel pump of a motor vehicle having an external power source and an internal combustion engine which receives operating fuel from said fuel pump, said method comprising the steps of:

connecting a dc-dc converter between said external power source and said fuel pump;

generating a voltage demand signal; and operating said dc-dc converter in response to said voltage demand signal dependent upon operating conditions of said internal combustion engine to control the drive voltage applied to said fuel pump to substantially equal a voltage level greater than, less than or substantially equal to the voltage level of said external power source.

14. A method for controlling an electric fuel pump as claimed in claim 13 wherein said step of generating a voltage demand signal comprises generating a constant voltage demand signal.

15. A method for controlling an electric fuel pump as claimed in claim 13 wherein said step of generating a voltage demand signal comprises generating a varying voltage demand signal corresponding to operating conditions of said internal combustion engine.

* * * * *